(12) United States Patent
Donahue et al.

(10) Patent No.: US 8,549,066 B1
(45) Date of Patent: Oct. 1, 2013

(54) SERVICE PROVIDER INTERFACE FOR DEPLOYING AND MANAGING APPLICATIONS ON A CLOUD

(75) Inventors: Jim Donahue, Sunnyvale, CA (US); Ricky Ho, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 84 days.

(21) Appl. No.: 12/869,549

(22) Filed: Aug. 26, 2010

(51) Int. Cl.
*G06F 15/16* (2006.01)

(52) U.S. Cl.
USPC ............... 709/203; 717/171; 718/1; 715/738

(58) Field of Classification Search
USPC ............. 709/203; 717/171; 718/1; 715/738
See application file for complete search history.

(56) References Cited

U.S. PATENT DOCUMENTS

| | | | |
|---|---|---|---|
| 7,596,620 B1 * | 9/2009 | Colton et al. | 709/226 |
| 2007/0283009 A1 * | 12/2007 | Takemura | 709/224 |
| 2011/0055399 A1 * | 3/2011 | Tung et al. | 709/226 |
| 2011/0126197 A1 * | 5/2011 | Larsen et al. | 718/1 |
| 2011/0213712 A1 * | 9/2011 | Hadar et al. | 705/80 |
| 2011/0271270 A1 * | 11/2011 | Bowen | 717/171 |
| 2012/0005584 A1 * | 1/2012 | Seago et al. | 715/738 |

* cited by examiner

*Primary Examiner* — Kyung H Shin
(74) *Attorney, Agent, or Firm* — Schwegman Lundberg Woessner P.A.

(57) ABSTRACT

A system is provided to deploy a computing application on a cloud using a service provider interface. The system comprises a launch request detector, a service provider interface selector, and a launcher. The launch request detector may be configured to detect a request to launch a server computer system within a virtualization service. The server computer system, in one example embodiment, comprises a computing application and a service provider interface layer. The service provider interface selector may be configured to determine an implementation of the virtualization service and access a service provider interface associated with the implementation of the virtualization service. The launcher may be configured to complete launching of the server computer system within the virtualization service, utilizing the selected service provider interface.

20 Claims, 5 Drawing Sheets

SERVICE PROVIDER INTERFACE FOR DEPLOYING AND MANAGING APPLICATIONS ON A CLOUD

This disclosure relates generally to the technical fields of software and/or hardware technology and, in one example embodiment, to system and method to deploy a computing application on a cloud using a service provider interface.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The phrase "cloud computing" refers to an architectural paradigm, in which computation is moved from local servers to a remote service that provides computation as a commodity or utility. A "cloud" is typically a large collection of shared commodity computation resources that can be interchangeably provisioned in response to clients' computation requests. Cloud computing is frequently used in software-as-a-service (SaaS) application architectures and may be viewed as an implementation choice for application deployment that leverages shared resources and improved cost structure of the cloud. A cloud computing approach may be used to implement a variety of computational paradigms, such as virtual machines, jobs, remote procedure calls, traditional servers, etc.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
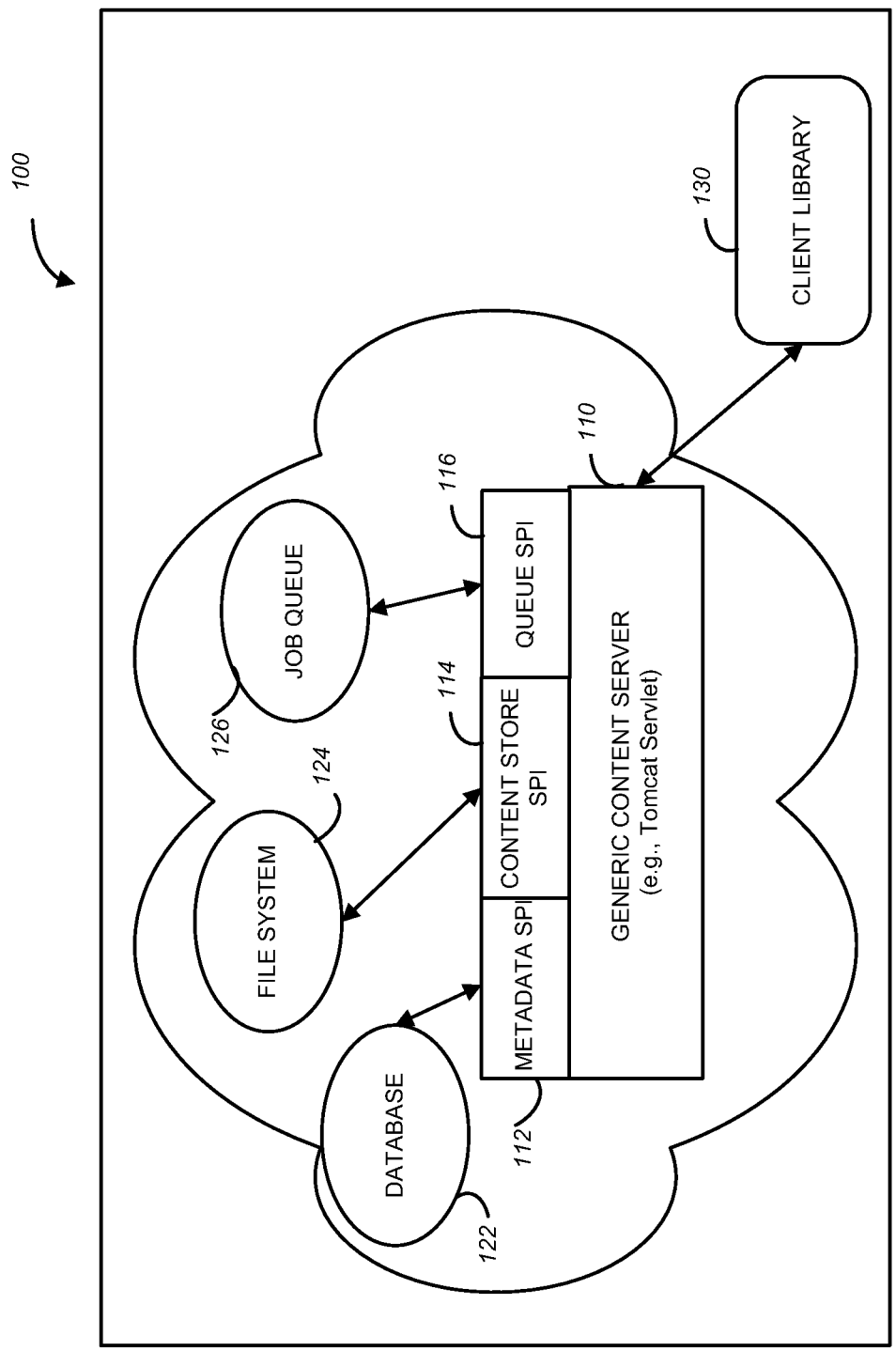
FIG. 1 is a diagrammatic representation of diagrammatic representation of a computing application configured to access cloud-specific services via a service provider interface, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A computing application (also referred to as merely an application) may be made available to users by deploying the application on one or more virtual instances of a machine running on a cloud, i.e., within a public or a private virtualization space. A virtualization space (also referred to as a cloud) may be provided by different providers. As each virtualization space provider may utilize a proprietary set of APIs that need to be used by applications, a virtualization space provided by a particular provider may require a specific set of accommodations that would need to be implemented with respect to a computing application in order to deploy that application on a cloud using that particular provider's virtualization space.

A computing application may be launched on a cloud by instructing the cloud provider to access one or more machine images containing the application description and load the one or more machine images onto the physical machines provided by the cloud provider and make it accessible to the user via a network. A machine image is a read-only boot image that is used for launching an instance of a virtual machine running one or more components of the requested computing application. One or more machine images representing a computing application may be provided to a network storage system (e.g., Amazon S3) by a control server (also referred to as a controller).

A system that provisions and manages a computing application hosted on one or more virtual instances of a machine may be referred to as a hosted service system. A hosted service system may be configured to provide automated administration of a computing application, replacing the administration tasks that would otherwise be performed by the customer when running in an on-premise production deployment. The technology within an example hosted service system may hide the behavior of the underlying virtualization service, and provide instances of a computing application that are substantially indistinguishable (e.g., in terms of reliability, security, and performance) from local on-premise deployments of the computing application. For example, a hosted service system may provision and manage computing applications such as a generic content server, Adobe® LiveCycle® Enterprise Suite (ES) and Adobe® ConnectPro® offered by Adobe Systems Incorporated, etc. While embodiments of the smart scheduler are described with reference to Amazon EC2 service, other virtualization services may be utilized.

In operation, a user can access a provider's web site and request to launch a computing application that can be deployed remotely on a plurality of virtual instances of a machine (on a cloud) such that the user no longer is required to deploy the computing application locally, within their own data center, on their own hardware. A request may be triggered by a user, e.g., by activating a visual control such as a "Start" button presented on a web page. The control server forwards the request to the access interface of the network storage, which causes the bootstrapping sequence to be started. In one embodiment, the bootstrapping of the network storage service generates an service provider interface (SPI) implementation object that provides the means by which the generic code can be stitched with the SPI layer and thus with the particular storage service. The bootstrapping of the implementation object involves establishing a connection to the cloud provider's service and setting up initial databases and file buckets as required.

Thus, a computing application may be generated such that the generic portion of the application is distinct from a service provider interface layer and yet may be provided together with the service provider interface layer. The service provider interface layer may include interfaces for different implementations of a virtualization service. Based on the particular implementation that is being used for launching the computing application on a cloud, the appropriate interface from the service provider interface layer is accessed and launched in order to permit interfacing between the computing application and cloud-specific services. A particular implementation of a virtualization service may include a particular implementation of a database service, a particular implementation of a file system service, and a particular implementation of a queue service. The interface for a particular virtualization service provider may thus include an interface for that database service, an interface for that file system service and an interface for that queue service. A diagrammatic representation 100 of a computing application configured to access cloud-specific services via a service provider interface (SPI) is shown in FIG. 1.

As shown in FIG. 1, interfaces that permit a generic content server 110 to access a cloud-specific database, a cloud-specific file system, and a cloud-specific job queue comprise a metadata SPI 112, a content store SPI 114, and a job queue SPI 116. The metadata SPI 112 permits access to a database 122, the content store SPI 114 permits access to a file system 124, and the job queue SPI 116 permits access to a job queue 126. The generic content server 110 is shown to be in communication with a client library computer system 130. Each of the database 122, the file system 124, and the job queue 126 may be provided on the same cloud as the generic content server 110 and its associated SPIs or off the cloud at a third party computer system.

Figure 2:
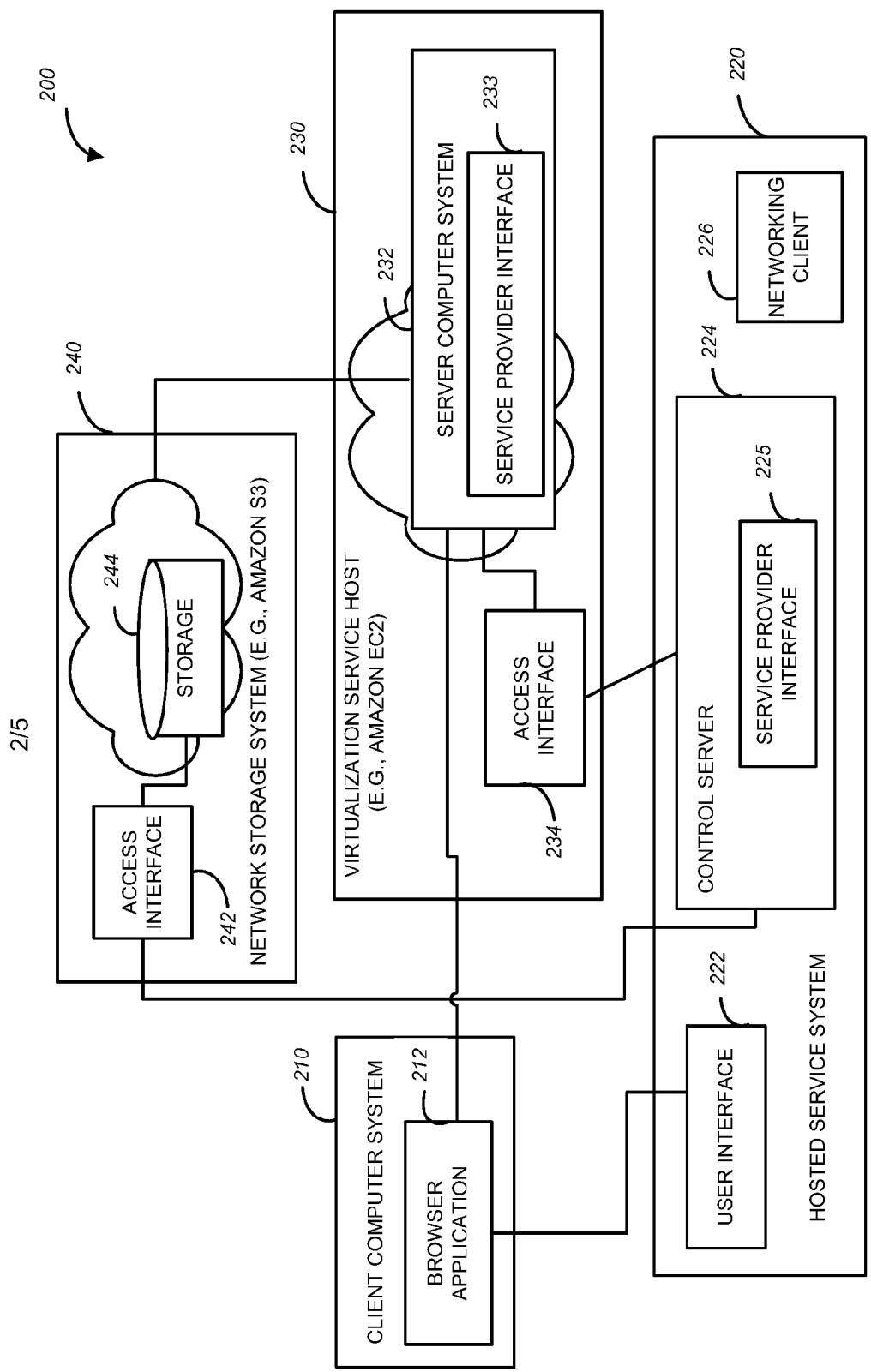
FIG. 2 is a block diagram showing an architecture within which a method and system to provision a computing application deployed on a cloud may be implemented, in accordance with an example embodiment.

An example architecture within which method and system to provision, on a cloud, a computing application and an associated service provider interface may be implemented is described with reference to an architecture diagram illustrated in FIG. 2. The architecture 200 may include a client computer system 220 and a hosted service system 220. In one example embodiment, the hosted service system 220 is to provision and manage an enterprise SaaS product utilizing a cloud-based computing service as a virtualization infrastructure. Cloud-based computing services, as shown in FIG. 2, are provided by a virtualization service host 230 and a network storage service 240. In one embodiment, a hosted service system 220 utilizes Amazon Elastic Compute Cloud (EC2) service as a virtualization service and Amazon Simple Storage Service (Amazon S3) as a network storage service. In some embodiments, the hosted service system 220 may utilize more than one virtualization service host, e.g., one host being Amazon EC2 and another host provided by Adobe Systems Incorporated. The client computer system 220 and the hosted service system 220 may be in communication with each other via a communications network that may be a public network (e.g., the Internet).

The virtualization service host 230 may load a server computer system 232 onto a cloud. The server computer system 232 may be accessed by the client 220 via a browser application 212. As mentioned above, a user in control of the client computer system 220 may send a request to the hosted service system 220 to load the server computer system 232. The request may be initiated via a user interface 222 provided by the hosted service system 220 to the client computer system 220 via the browser application 212.

The user interface 222, in one embodiment, provides both an end-user's and a system administrator's view of the server computer system 232 and also permits issuing control operations to the server computer system 232 and permits viewing the resulting changes in the state of the server computer system 232. For example, where a computing application provided by the server computer system 232 is a content server, an end-user may manipulate various electronic forms. The user interface 222 may also serve as a source of information for the hosted service system 220, including documentation, downloads, and support. The user interface 222, in one embodiment, uses Adobe® Flex® software, offered by Adobe Systems Incorporated, as the user interface technology for the implementation of the user interface. The user interface 222, in one embodiment, uses an XML (Extensible Markup Language)-based representational state transfer (REST) style secure communications protocol to synchronize its operations with a control server 224. A request to access the user interface 222 may be authenticated using one of a variety of authentication techniques.

The request from the client computer system 220 to load the server computer system 232 is received at the control server 224, which responds to the request by activating an access interface 234 provided by the virtualization service host 230. The control server 224, in one example embodiment, provides coordination between the components of the architecture 200, provides administration and monitoring of the virtualization service host 230, and also may be configured to audit system usage and resource allocation with respect to the server computer system 232. The control server 224 includes a database to store information pertaining to various aspects of system usage. The control server 224, in one embodiment, runs within a standard Hypertext Transfer Protocol Secure (HTTPS)-compliant web server and may be deployed as a publically accessible web application that is available outside a firewall. The control server 224, in one embodiment, is implemented using Ruby on Rails™ technology.

The virtualization service host 230 accesses the storage 244 of the network storage system 240 to obtain one or more machine images in order to load the associated server computer system 232. The machine images can be uploaded to the network storage system by the control server 224 utilizing an access interface 242 provided with the network storage system 240. The hosted service system 220 further includes a secure networking client 226 to provide a bidirectional, encrypted, compressed connection between a machine in the end-user's secure network environment (e.g., the client computer system 220) and one or more instances of a virtual machine running within the virtualization infrastructure (the server computer system 232). The networking client 226 manages various aspects of transmission control protocol (TCP) traffic forwarding, encryption, and network discovery, such that the user can access the server computer system 232 as if it was running locally on the user's machine. In this mode, the user's network security envelope is extended to surround the server computer system 232 using comparable levels of encryption and protection against network security threats.

As mentioned above, in one example embodiment, the server computer system 232 hosts a computing application (e.g., a content server) that can access cloud-dependent services via respective interfaces to those cloud-dependent services. The respective interfaces may be collectively referred to as a service provider interface layer. A machine image associated with the server computer system 232 may include several versions of a service provider interface each of which correspond to a different implementation of a virtualization service. When the server computer system 232 is being loaded on a cloud, a selector module provided with the computing application hosted by the server computer system 232 determines which of the versions is to be loaded for the particular implementation of the virtualization service, accesses the appropriate version of the service provider interface and loads a service provider interface 233 as part of starting the server computer system 232 on a cloud. Some components of the server computer system that may be launched on a cloud are described with reference to FIG. 3.

Figure 3:
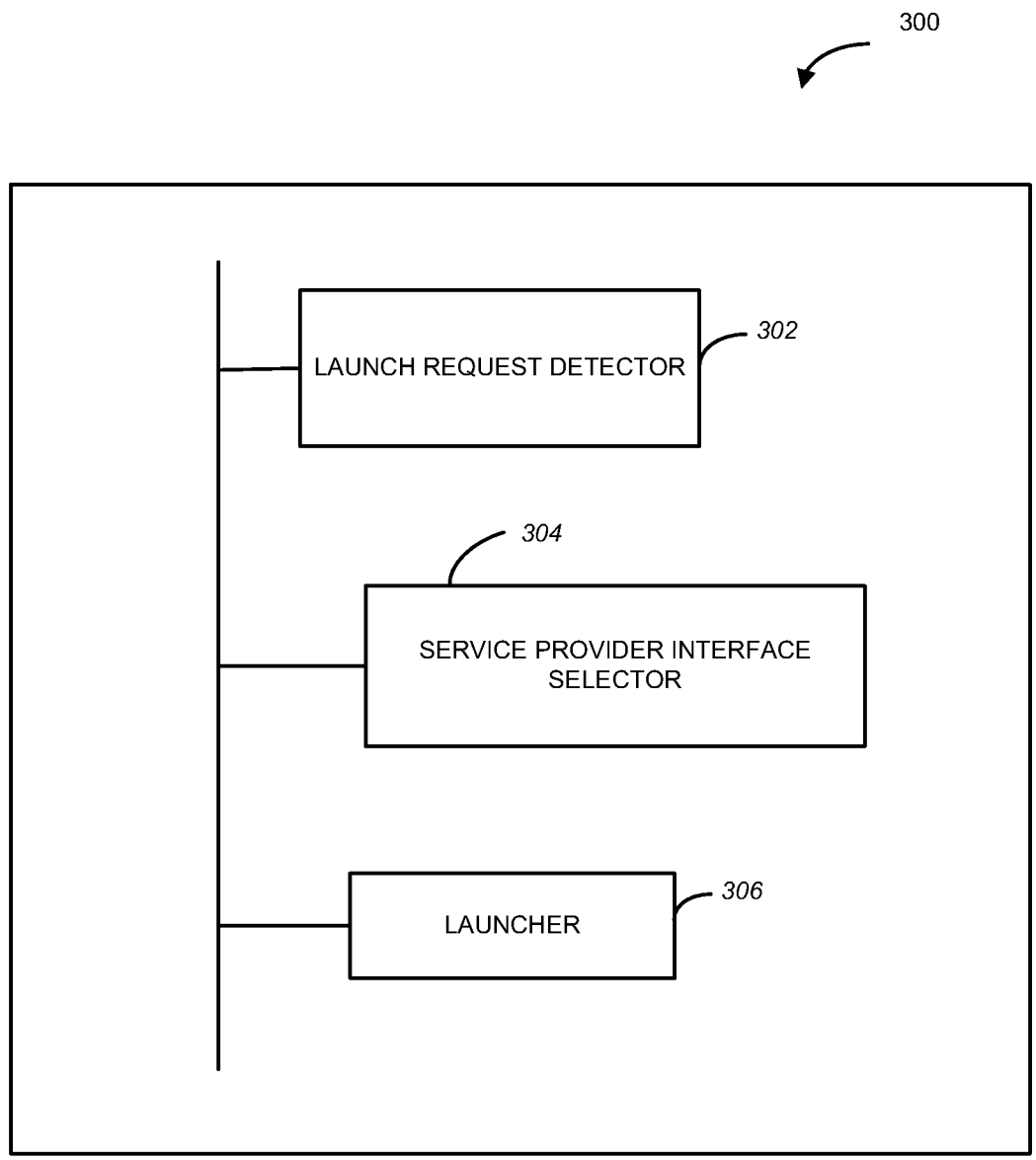
FIG. 3 is a block diagram illustrating some components of a server computer system comprising a generic computing application and a service provider interface layer, in accordance with an example embodiment.

FIG. 3 is a block diagram illustrating a server computer system 300 that corresponds to the server computer system 232 of FIG. 2. The system 300, in one example embodiment, comprises a launch request detector 302, a service provider interface selector 304, and a launcher 306. The launch request detector 302 may be configured to detect a request to launch a server computer system within a virtualization service. The server computer system, in one example embodiment, comprises a computing application (e.g., a content server) and a service provider interface layer. The service provider interface selector 304 may be configured to determine an implementation of the virtualization service, in response to a request to launch the server computer system, and access a service provider interface associated with the implementation of the virtualization service. The virtualization service may be a public virtualization service or a private virtualization service. The service provider interface may be one of a plurality of service provider interfaces provided in the service provider interface layer, where each of the plurality of service provider interfaces associated with a different implementation of the virtualization service. The launcher 306 may be configured to complete launching of the server computer system within the virtualization service, utilizing the selected service provider interface.

The selected service provider interface, in one example embodiment, comprises an interface for a cloud-dependent database service (e.g., the metadata SPI 112 of FIG. 1), an interface for a cloud-dependent file system service (e.g., the content store SPI 114 of FIG. 1), and an interface for a cloud-dependent job queue service (e.g., a queue SPI 116 of FIG. 1).

Example operations performed by the system 300 are discussed below with reference to FIG. 4.

Figure 4:
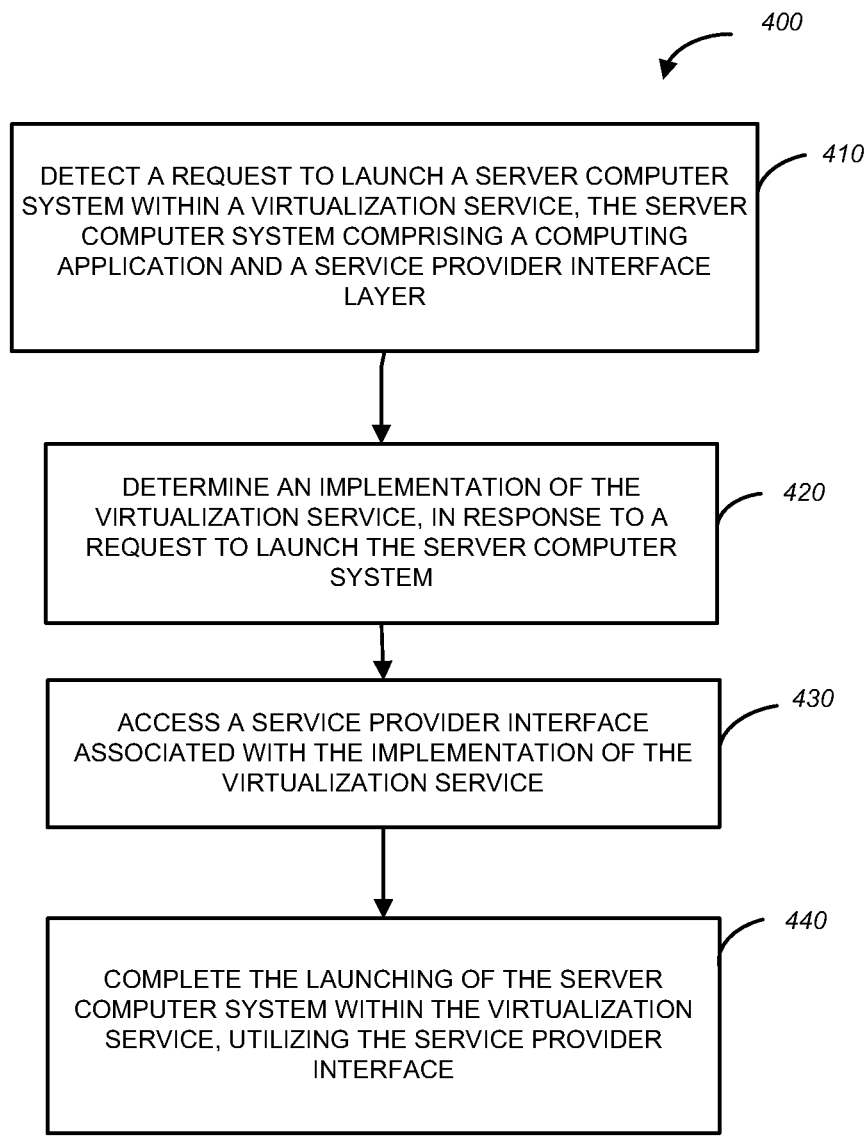
FIG. 4 is a flow chart illustrating a method for deploying a computing application on a cloud utilizing a service provider interface suitable for a particular implementation of a virtualization service, in accordance with an example embodiment.

FIG. 4 is a flow chart illustrating a method 400 for determining an optimized configuration for deploying a computing application on a cloud, in accordance with an example embodiment. The method 400 may be performed by processing logic that may comprise hardware, software (such as run on a general purpose computer system programmed to perform particular functions pursuant to instructions from program software or on a dedicated machine), or a combination of both. The processing logic, according to example embodiments, may reside in or comprise any of the modules shown in FIG. 3.

As shown in FIG. 4, the method 400 commences with operation 410, where the launch request detector 302 of FIG. 3 detects a request to launch a server computer system on a cloud (within a virtualization service). The server computer system, in one example embodiment, comprises a computing application and a service provider interface layer. At operation 420, in response to the request to launch the server computer system, the service provider interface selector 304 of FIG. 3 determines an implementation of the virtualization service and accesses a service provider interface associated with the determined implementation of the virtualization service at operation 430. At operation 440, the launcher 306 of FIG. 3 completes launching of the server computer system within the virtualization service, utilizing the service provider interface.

Figure 5:
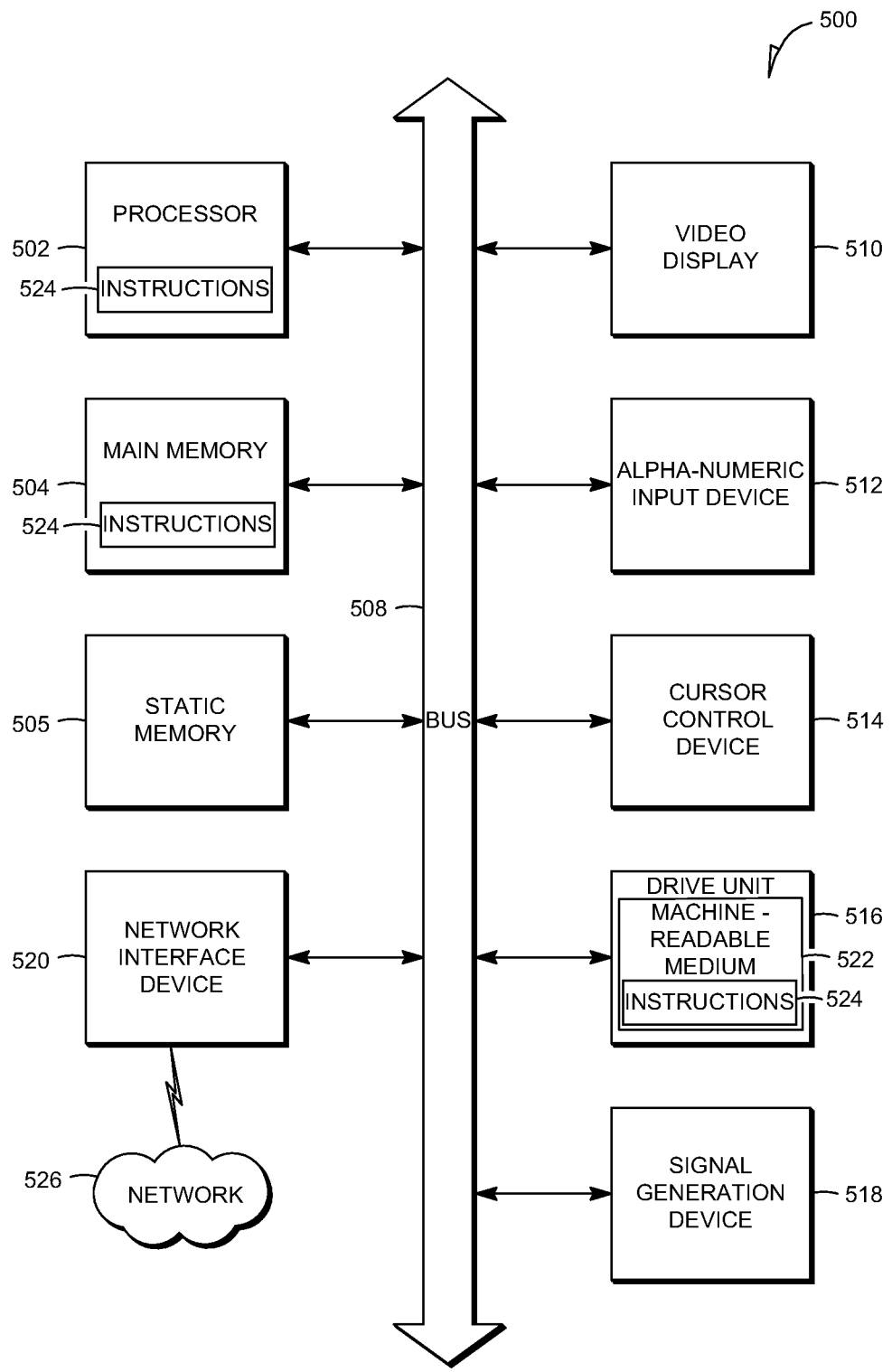
FIG. 5 is a diagrammatic representation of a machine in the example form of a computer system within which a set of instructions, for causing the machine to perform any one or more of the methodologies discussed herein, may be executed.

FIG. 5 is a diagrammatic representation of a machine in the example electronic form of a computer system 500 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) cursor control device 514 (e.g., a mouse), a disk drive unit 516, a signal generation device 518 (e.g., a speaker) and a network interface device 520.

The disk drive unit 516 includes a computer-readable (or machine-readable) medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system to deploy a computing application on a cloud using a service provider interface have been described. Example approaches described herein may be utilized beneficially with a variety of computing applications, such as, e.g., content servers and cloud management systems.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
   detecting a request to launch a server computer system within a virtualization service, the server computer system comprising a generic portion of a computing application and a service provider interface layer distinct from the generic portion of the computing application, the generic portion of the computing application including code compatible with multiple different implementations of virtualization services;
   in response to a request to launch the server computer system, determining an implementation of the virtualization service corresponding to the request;
   accessing a service provider interface associated with the implementation of the virtualization service corresponding to the request, the service provider interface being from a plurality of service provider interfaces provided in the service provider interface layer, each of the plurality of the service provider interfaces associated with a different implementation of the virtualization service; and
   completing launching of the server computer system within the virtualization service, utilizing the service provider interface.

2. The method of claim 1, wherein the service provider interface comprises an interface for a cloud-dependent database service.

3. The method of claim 1, wherein the service provider interface comprises an interface for a cloud-dependent file system service.

4. The method of claim 1, wherein the service provider interface comprises an interface for a cloud-dependent job queue service.

5. The method of claim 1, wherein the computing application is a content server.

6. The method of claim 1, wherein the virtualization service is a public virtualization service.

7. The method of claim 1, wherein the virtualization service is a private virtualization service.

8. The method of claim 1, comprising generating a read-only boot image to be used for launching an instance of a virtual machine running the computing application.

9. The method of claim 8, comprising providing the read-only boot image to a network storage system accessible by the virtualization service.

10. The method of claim 1, comprising performing a bootstrapping sequence in response to in response to the request to launch the server computer system.

11. A computer-implemented system comprising:
    at least one processor coupled to a memory;
    a launch request detector to detect, using the at least one processor, a request to launch a server computer system within a virtualization service, the server computer system comprising a generic portion of a computing application and a service provider interface layer distinct from the generic portion of the computing application, the generic portion of the computing application including code compatible with multiple different implementations of virtualization services;
    a service provider interface selector to:
    determine, using the at least one processor, an implementation of the virtualization service corresponding to the request, in response to a request to launch the server computer system, and
    access, using the at least one processor, a service provider interface associated with the implementation of the virtualization service corresponding to the request, the service provider interface being from a plurality of service provider interfaces provided in the service provider interface layer, each of the plurality of the service provider interfaces associated with a different implementation of the virtualization service; and
    a launcher to complete launching of the server computer system within the virtualization service, utilizing the service provider interface.

12. The system of claim 11, wherein the service provider interface comprises an interface for a cloud-dependent database service.

13. The system of claim 11, wherein the service provider interface comprises an interface for a cloud-dependent file system service.

14. The system of claim 11, wherein the service provider interface comprises an interface for a cloud-dependent job queue service.

15. The system of claim 11, wherein the computing application is a content server.

16. The system of claim 11, wherein the virtualization service is a public virtualization service.

17. The system of claim 11 wherein the virtualization service is a private virtualization service.

18. A machine-readable non-transitory medium having instruction data to cause a machine to:
   detect a request to launch a server computer system within a virtualization service, the server computer system comprising a generic portion of a computing application and a service provider interface layer distinct from the generic portion of the computing application, the generic portion of the computing application including code compatible with multiple different implementations of virtualization services;
   determine an implementation of the virtualization service corresponding to the request, in response to a request to launch the server computer system;
   access a service provider interface associated with the implementation of the virtualization service corresponding to the request, the service provider interface being from a plurality of service provider interfaces provided in the service provider interface layer, each of the plurality of the service provider interfaces associated with a different implementation of the virtualization service; and
   complete launching of the server computer system within the virtualization service, utilizing the service provider interface.

19. The machine-readable non-transitory medium of claim 18, wherein the service provider interface comprises an interface for a cloud-dependent database service, an interface for a cloud-dependent file system service, and an interface for a cloud-dependent job queue service.

20. The machine-readable non-transitory medium of claim 18, wherein the virtualization service is a public or a private virtualization service.

\* \* \* \* \*